(12) United States Patent
Lin et al.

(10) Patent No.: US 9,641,908 B2
(45) Date of Patent: May 2, 2017

(54) METHOD AND SYSTEM FOR TRANSFERRING REAL-TIME AUDIO/VIDEO STREAM

(71) Applicant: YUAN ZE UNIVERSITY, Taoyuan County (TW)

(72) Inventors: Chi-Fang Lin, Hsinchu (TW); Hao-Ting Wei, Taipei (TW); Yang-Cheng Chang, Taipei (TW)

(73) Assignee: YUAN ZE UNIVERSITY, Taoyuan County (TW)

( * ) Notice: Subject to any disclaimer, the term of this patent is extended or adjusted under 35 U.S.C. 154(b) by 362 days.

(21) Appl. No.: 14/485,699

(22) Filed: Sep. 13, 2014

(65) Prior Publication Data
US 2016/0021404 A1 Jan. 21, 2016

(30) Foreign Application Priority Data
Jul. 21, 2014 (TW) .............................. 103124921 A

(51) Int. Cl.
*H04N 21/643* (2011.01)
*H04N 21/84* (2011.01)
*H04N 21/845* (2011.01)
*H04N 21/854* (2011.01)

(52) U.S. Cl.
CPC ....... *H04N 21/64322* (2013.01); *H04N 21/84* (2013.01); *H04N 21/845* (2013.01); *H04N 21/8455* (2013.01); *H04N 21/85406* (2013.01)

(58) Field of Classification Search
CPC ........... H04N 21/2625; H04N 7/17318; H04N 21/64322; H04N 21/84; H04N 21/845; H04N 21/8455; H04N 21/85406
See application file for complete search history.

(56) References Cited

U.S. PATENT DOCUMENTS

| | | | |
|---|---|---|---|
| 7,386,872 B2 * | 6/2008 | Shimizu | H04N 7/17318 348/207.1 |
| 2015/0067722 A1 * | 3/2015 | Bjordammen | H04N 21/2625 725/32 |

\* cited by examiner

*Primary Examiner* — Sumaiya A Chowdhury
(74) *Attorney, Agent, or Firm* — Li & Cai Intellectual Property (USA) Office

(57) ABSTRACT

A method and system for transferring real-time audio/video stream (AVS) is provided. The method for transferring real-time AVS includes the following steps of: first, receiving a real-time AVS by a server; transforming the real-time AVS into a fragmented media data (FMD) and storing the FMD in a storage module of the server, wherein the FMD comprises a starting-point, an overall fragment information and at least one media fragment (MF); next, generating a segmented media data (SMD) by encapsulating the FMD when the server receives a playback command. The step of generating the SMD comprises encapsulating the starting-point and the overall fragment information into an initial segment information of the SMD. Each playable segment of the SMD has multiple MFs and a segment index recording segment order to indicate each MF. The final step is to transfer the SMD to browser software for playback.

11 Claims, 5 Drawing Sheets

METHOD AND SYSTEM FOR TRANSFERRING REAL-TIME AUDIO/VIDEO STREAM

BACKGROUND

1. Technical Field

The present disclosure relates to an audio/video stream (AVS) process, in particular, to a real-time AVS process.

2. Description of Related Art

With the development of network technology, network services with high speed and wideband are provided so that the transmission speed of multimedia data on the network is substantially improved. Subsequently, multimedia data transmitted on the network becomes more popular. Users can completely and clearly present information by multimedia data. The information such as instructional videos, live news and web TV can be greatly transmitted. Many academic institutions, research and development organizations and related operators continuously develop the codec technology and the specification of multimedia. Hence, the related applications for browsing live audio/video data on the network are very plentiful. For example, users can use personal electronic devices to watch real-time audio/video data on the Internet by installing mobile phone applications or web playback programs on the smart phones or the computer equipments.

However, in current development of network multimedia, the related software or applications have to be installed in the personal devices. Each manufacture such as camera developer, server provider or user browser provider may use their own codec specification or network transfer specification. Consequently, users have to install variety of software or applications depending on the requirements from different developers or providers. This will cause inconvenience to users. Furthermore, the real-time transmission quality of network multimedia may be bad to be intermittent or unstable due to the development problems even if the software or applications required by the developers or providers are installed. Therefore, the quality of playing multimedia on the network is unable to have great user experience under the well-developed network transmission environment.

SUMMARY

Accordingly, a method for transferring real-time AVS is disclosed in the present disclosure. The method provides a codec specification of more flexible real-time AVS process. A server encodes a real-time AVS into a fragmented media data (FMD) and encapsulates the FMD into a segmented media data (SMD) according to a playback command transmitted from a user equipment. Thus, the user equipment can easily analyze the real-time AVS and flexibly play the real-time AVS according to demands so as to smoothly transmit and provide better user experiences.

An embodiment of the present disclosure provides a method for transferring real-time AVS. The method for transferring real-time AVS includes the following steps of: first, receiving a real-time AVS by a server; next, transforming the real-time AVS into an FMD and storing the FMD in a storage module of the server, wherein the FMD comprises a starting-point, an overall fragment information and at least one media fragment (MF); next, generating an SMD by encapsulating the FMD when the server receives a playback command. The step of generating the SMD by encapsulating the FMD comprises encapsulating the starting-point and the overall fragment information of the FMD into an initial segment information of the SMD. Each playable segment has multiple MFs and a segment index recording segment order to indicate each MF. The final step is to transfer the SMD to browser software for playback.

Another embodiment of the present disclosure provides a system for transferring real-time AVS. The system for transferring real-time AVS comprises a server, an FMD codec module, an SMD codec module and a transferring module. The server is configured to receive a real-time AVS generated by at least one camera from network. The FMD codec module is configured to encode the real-time AVS into an FMD. The SMD codec module is configured to transform the FMD into an SMD. The transferring module is configured to transfer the SMD requested from a browser software by a network transfer protocol.

In view of above, the method and system for transferring real-time AVS in the embodiments of the present disclosure not only provide real-time AVS process and playback method with high compatibility but also adopt the technical means of encoding the real-time AVS into the FMD to improve the performance when the real-time AVS is loaded to the server. In addition, since the SMD provided to the browser software is encapsulated from the FMD, the browser software can easily analyze the SMD without installing additional codec. Accordingly, the browser software can smoothly receive and play the real-time AVS so as to increase the playback performance.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the scope of the present disclosure.

DESCRIPTION OF THE EXEMPLARY EMBODIMENTS

Figure 1:
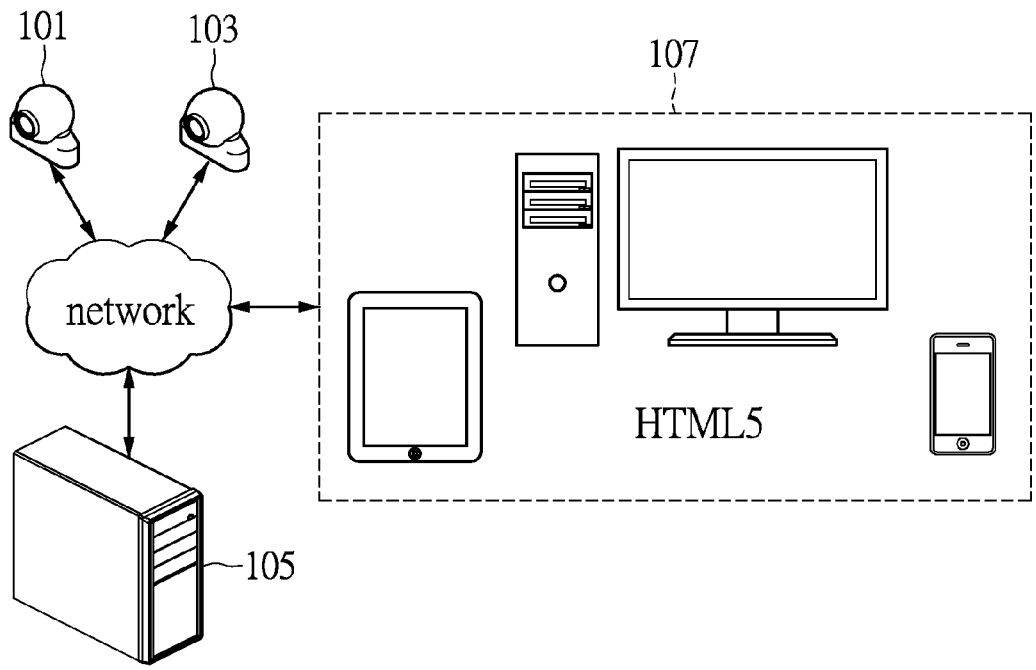
FIG. 1 is a schematic diagram of the real-time AVS transferring network architecture provided in accordance with an embodiment of the present disclosure.

In the following paragraphs, drawings will be referred to explain each embodiment of the present disclosure. However, the concept in the present disclosure may be implemented in different forms and should not be limited by the embodiments described in the present disclosure. Besides, the same reference numbers are used in the drawings and the description to refer to the same or like parts.

The embodiment of the system for transferring real-time AVS

FIG. 1 is a schematic diagram of the real-time AVS transferring network architecture 10 provided in accordance with an embodiment of the present disclosure. Referring to FIG. 1, the real-time AVS transferring network architecture 10 comprises cameras 101 and 103, a server 105 and a user equipment 107. The cameras 101 and 103 are the nodes in the network architecture for providing real-time AVS. The cameras 101 and 103 provide the real-time AVS such as the multimedia stream of video codec standard of H.262. The cameras 101 and 103 can be, for example, Internet Protocol (IP) cameras or mobile communication devices such as a notebook, a tablet and a mobile handheld device with a camera module. All of these belong to applicable scope of the cameras 101 and 103 of the real-time AVS transferring network architecture in the embodiment of the present disclosure. The cameras 101 and 103 can be disposed in any live scene to provide any video and/or audio data from the scene. The cameras 101 and 103 transform the captured video and/or audio data into network packet format and transmit to the server 105 through the Internet.

Figure 3:
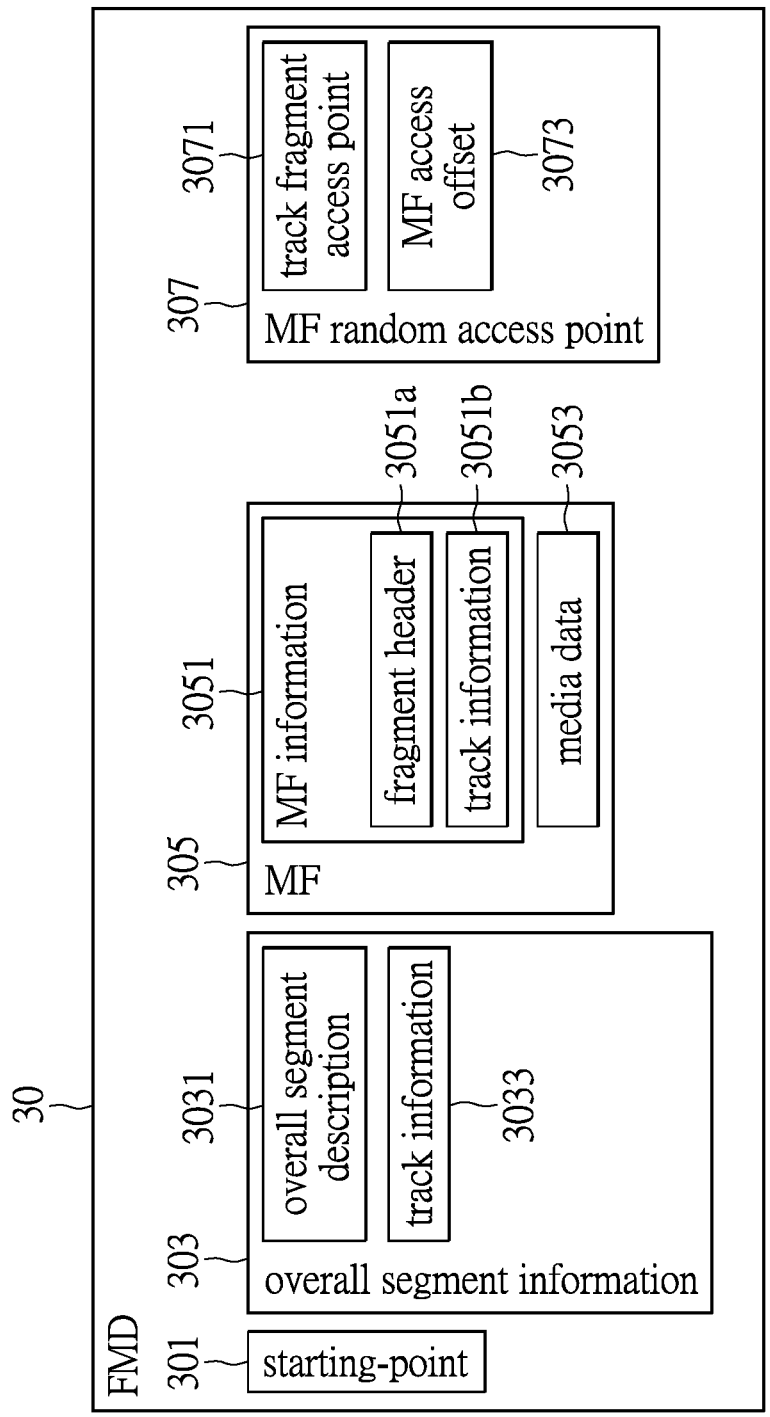
FIG. 3 is a schematic diagram of the data format of the FMD provided in accordance with an embodiment of the present disclosure.

The server 105 is the node in the real-time AVS transferring network architecture 10 for collecting real-time AVS and providing the collected real-time audio/video data to the user equipment 107. In the present embodiment, the server 105 receives the network packets of real-time AVS, then immediately analyzes these real-time AVS packets and transforms into the FMD. The FMD in the present embodiment is the media data of the fragmented MP4 format. The embodiment of the data format of the FMD is illustrated in FIG. 3. Next, after the AVS is transformed into the data format of the FMD, the server 105 stores the FMD. Then, the server 105 further encapsulates the processed FMD into the SMD for providing the data format of the real-time AVS when a playback commend is requested from the user equipment 107.

The user equipment 107 is an electronic device for users to receive and play the real-time AVS by acquiring the real-time AVS of the cameras 101 and 103 from the server 105 through the Internet. The user equipment 107 can be, for example, a personal desktop, a notebook, a mobile handheld device or a tablet. Any electronic device with browser software supporting Hypertext Markup Language (HTML) can be the user equipment 107 of the present embodiment. Accordingly, users can execute the browser software supporting HTML such as Chrome, Opera, Internet Explorer, Firefox, Safari, etc. The user equipment 107 establishes communication connection with the server 105 by Hypertext Transfer Protocol (HTTP) or Hypertext Transfer Protocol Secure (HTTPS) to send the request for playing the real-time AVS to the server 105. After acquiring the related real-time AVS, the browser software of the user equipment 107 plays the real-time AVS of the cameras 101 and 103.

Figure 2:
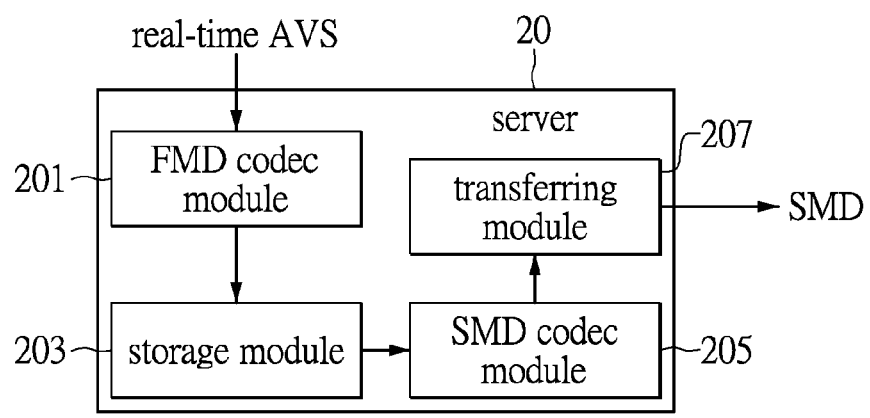
FIG. 2 is a functional block schematic diagram of the server provided in accordance with an embodiment of the present disclosure.

FIG. 2 is a functional block schematic diagram of the server provided in accordance with an embodiment of the present disclosure. The server 20 comprises an FMD codec module 201, a storage module 203, an SMD codec module 205 and a transferring module 207. The server 20 receives the real-time AVS through the network, for example, the real-time AVS captured by the cameras with Internet communication protocol function in a live scene. The real-time AVS captured and compressed by the cameras in the network can be, for example, the H.264 codec standard. Then, the FMD codec module 201 encodes the received real-time AVS into the FMD. The data format of the FMD is illustrated in FIG. 3. In an embodiment of the server 20, the FMD codec module 201 transforms the data format of the real-time AVS from H.264 data format to the fragmented MPEG-4 media data. The server 20 stores the transformed FMD in the storage module 203.

Figure 4:
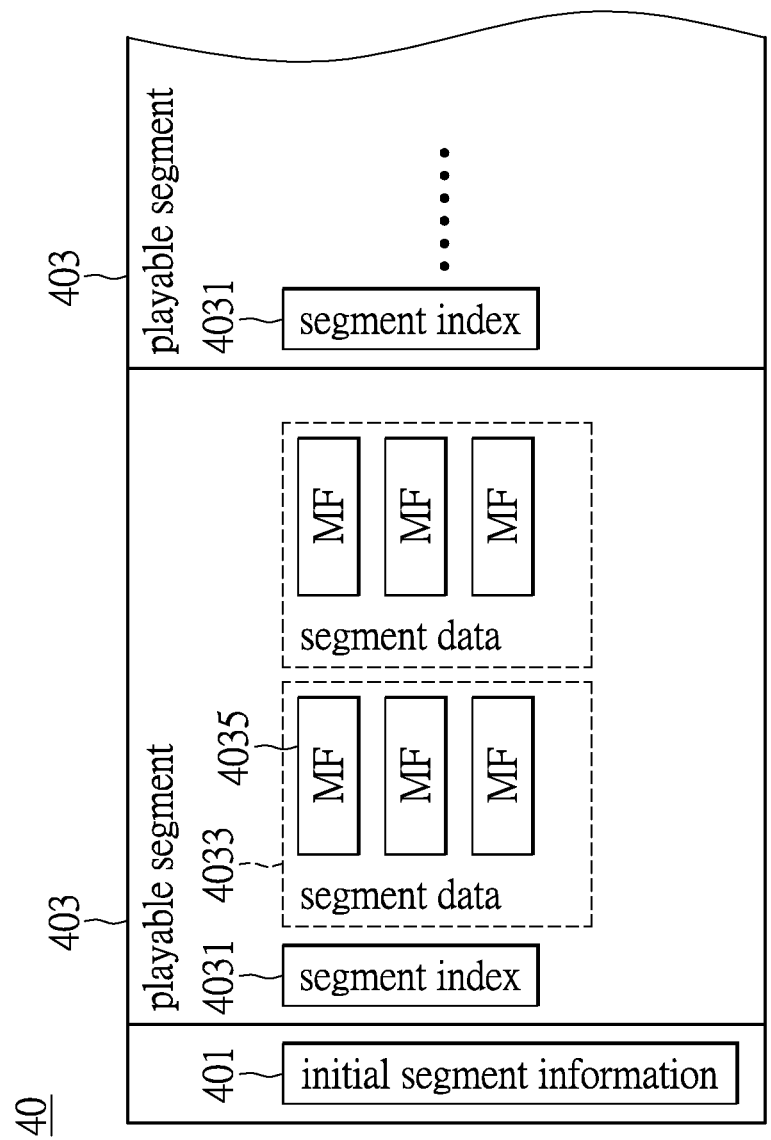
FIG. 4 is a schematic diagram of the data format of the SMD provided in accordance with an embodiment of the present disclosure.

The SMD codec module 205 is configured to encapsulate the FMD into the SMD. The SMD is, for example, the segmented MPEG-4 media data. The data format of the SMD is illustrated in FIG. 4. In an embodiment of the present disclosure, the server 20 can receive a playback commend from the user equipment. For example, after the browser software of the user equipment establishes receiving and transmitting channels with the server through HTTP or HTTPS, a multimedia interface is provided and a playback button on the multimedia interface is pressed. After receiving the playback commend from the user equipment, the server 20 decodes the FMD in the storage module 203 and encapsulates into the SMD. The transferring module 207 transfers the SMD to the multimedia interface of the browser software of the user equipment to respond the playback request from the user equipment.

FIG. 3 is a schematic diagram of the data format of the FMD provided in accordance with an embodiment of the present disclosure. Referring to FIG. 3, the FMD in the present embodiment is the fragmented MPEG-4 (MP4) data format which can be implemented according to the data format of ISO/IEC 14496-1:2001 or ISO/IEC 14496-1:2003. Referring to FIG. 1, FIG. 2 and FIG. 3, after the real-time AVS captured by the cameras 101 and 103 is transferred to the server 105, the FMD codec module 201 immediately encapsulates the real-time AVS packets into the FMD. For example, each minute of the real-time AVS is fragmented into one FMD. The continuously received real-time AVS are fragmented into multiple sequential FMD.

The data format of the FMD 30 comprises a starting-point 301, an overall segment information 303, a media fragment (MF) 305 and MF random access point 307. The starting-point 301 is the file execution information of the media, for example, the support application information of the multimedia. The starting-point 301 can be implemented as the file type and compatibility (ftyp) of the MP4 data format. The overall segment information 303 records the metadata information of the multimedia which can be implemented as the container for all the metadata (moov) of the MP4 data format. The overall segment information 303 comprises an overall segment description 3031 and a track information 3033. The overall segment description 3031 records the media characteristic information of the multimedia such as establishment time, time length, etc. The overall segment description 3031 can be implemented as the movie header and overall declarations (mvhd) of the MP4 data format. The track information 3033 records the overall track information of the multimedia such as audio frequency, subtitles, etc. The track information 3033 can be implemented as the container for an individual track or stream (trak) of the MP4 data format.

MF 305 records contents of the multimedia. The MF 305 in the present embodiment has a playable media data 3053. It should be noted that an FMD 30 may comprise at least one MF 305. The order of each MF 305 can be acquired from the information recorded in each MF 305. MF 305 comprises an MF information 3051 and a media data 3053. The MF information 3051 records the fragment description information of the multimedia which can be implemented as the movie fragment (moof) of the MP4 data format. The MF information 3051 comprises a fragment header 3051a and a track information 3051b. The fragment header 3051a records the fragment characteristic information which can be implemented as the movie fragment header (mfhd) of the MP4 data format. The track information 3051b records the single track information which can be implemented as the track fragment (traf) of the MP4 data format. The media data 3053 records the multimedia data which can be implemented as media data container (mdat) of the MP4 data format. If the FMD has multiple MFs 305, the fragment headers 3051a and the track information 3051b of the MFs 305 can be used to identify the order between each MF 305 so that the codec can play the media data 3053 according to the accurate time sequence.

The MF random access point 307 is at the end of the FMD 30 and is used to indicate the termination of the FMD 30. The MF random access point 307 can be implemented as the movie fragment random access (mfra) of the MP4 data format. The MF random access point 307 comprises a track fragment access point 3071 and a MF access offset 3073. The track fragment access point 3071 records the end point of the track which can be implemented as the track fragment random access (tfra) of the MP4 data format. The MF access offset 3073 records the offset of the MF 305 which can be implemented as the movie fragment random access offset (mfro) of the MP4 data format.

The embodiment of the present disclosure transforms the real-time AVS into the FMD 30 and utilizes the data format of the FMD 30 to provide simple and quick transformation. Hence, the transforming and loading time can be reduced to conserve the time for processing the real-time AVS.

Referring to FIG. 1 and FIG. 3, it should be noted that if the server 105 directly provides the multiple transformed FMD 30 to the user equipment 107, each FMD 30 may have the MF random access point 307 to record the termination and the offset of the FMD 30. Hence, when the user equipment 107 plays the real-time AVS, it has to read each MF random access point 307 and compute the offset value by itself to acquire the next FMD. This may degrade the efficiency when the user equipment 107 plays the real-time AVS. In order to increase the efficiency when the user equipment 107 plays the real-time AVS, the server 105 in the embodiment of the preset disclosure further encapsulates the FMD 30 into the data format of the SMD to increase the efficiency when the user equipment 107 plays the real-time AVS.

Figure 5:
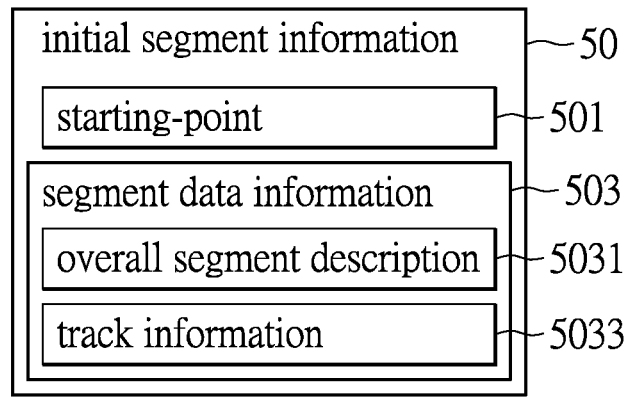
FIG. 5 is a schematic diagram of the data format of the initial segment information provided in accordance with an embodiment of the present disclosure.

FIG. 4 is a schematic diagram of the data format of the SMD provided in accordance with an embodiment of the present disclosure. The SMD in the present embodiment is the segmented MPEG-4 (MP4) data format which can be implemented according to the data format of ISO/IEC 14496-1:2001 or ISO/IEC 14496-1:2003. Referring to FIG. 4, the SMD 40 comprises an initial segment information (Segment Type, styp) 401 and multiple playable segments 403. The detailed data format of the initial segment information 401 is illustrated in FIG. 5. FIG. 5 is a schematic diagram of the data format of the initial segment information provided in accordance with an embodiment of the present disclosure. The initial segment information 50 comprises a starting-point 501 and a segment data information 503. The starting-point 501 is the file execution information of the media, for example, the supportapplication information of the multimedia. The starting-point 501 can be implemented as the file type and compatibility (ftyp) of the MP4 data format. The segment data information 503 records the metadata information of the multimedia which can be implemented as the container for all the metadata (moov) of the MP4 data format. The segment data information 503 comprises an overall segment description 5031 and a track information 5033. The overall segment description 5031 records the media characteristic information of the multimedia such as establishment time, time length, etc. The overall segment description 5031 can be implemented as the movie header and overall declarations (mvhd) of the MP4 data format. The track information 5033 records the overall track information of the multimedia such as audio frequency, subtitles, etc. The track information 5033 can be implemented as the container for an individual track or stream (trak) of the MP4 data format.

Referring to FIG. 2 to FIG. 5, during the process of generating the SMD 40, the SMD codec module 205 decodes the FMD 30 to acquire the starting-point 301 and the overall segment information 303, and encapsulates the portions recording the overall general information of the multimedia into the initial segment information 50. Then, the server 20 encapsulates the MF 305 of the FMD 30 into the multiple playable segments 403 of the SMD 40.

Figure 6:
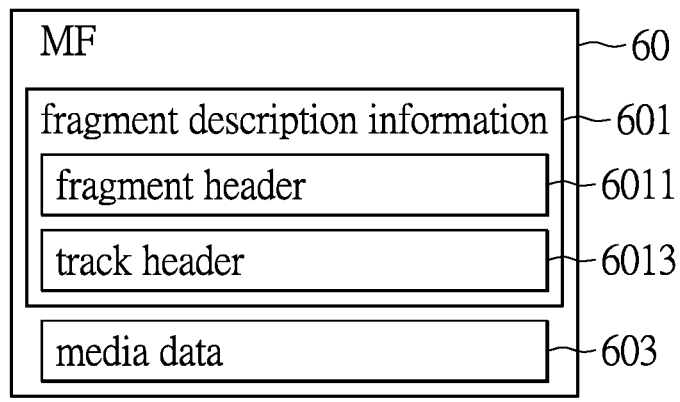
FIG. 6 is a schematic diagram of the data format of the MF provided in accordance with an embodiment of the present disclosure.

Referring to FIG. 4 again, the multiple playable segments 403 of the SMD 40 comprise segment indexes 4031 and multiple MFs 4035. The segment index (sidx) 4031 records the fragment order of the MF to indicate the order of each MF 4035 of the playable segment 403. The data format of the MF 4035 is illustrated in FIG. 6. FIG. 6 is a schematic diagram of the data format of the MF provided in accordance with an embodiment of the present disclosure. The MF (Fragment) 60 records contents of the multimedia. The MF 60 in the present embodiment comprises a fragment description information 601 and a media data 603. The fragment description information 601 records the detailed information of the fragment of the multimedia which can be implemented as the moof of the MP4 data format. The fragment description information 601 comprises a fragment header 6011 and a track header 6013. The fragment header 6011 records the fragment characteristic information which can be implemented as the mfhd of the MP4 data format. The track header 6013 records the single track information, specifically, the header information of the single track which can be implemented as the track fragment header (tfhd) of the MP4 data format. The media data 603 records multimedia data which can be implemented as the mdat of the MP4 data format.

Referring to FIG. 2, FIG. 3, FIG. 4 and FIG. 6, after decoding the MF 305 of the FMD 30, the SMD codec module 205 individually encapsulates the MF 305 of the FMD 30 into the playable segment 403. Therefore, the encapsulated playable segment 403 has multiple MFs 60 with the same data format as the MF 305. Each MF 60 has the fragment header 6011 and the track header 6013 of the fragment so that each MF 4035 in the playable segment 403 can be identified by the segment index 4031. For example, the track time point or the length of each track of each MF 4035 can be identified. The SMD 40 in the present embodiment is provided for the server 20 to promptly decode the FMD 30 and quickly encapsulate the initial segment information 401 without additional decoding time. Further, the data format of the multiple MFs 4035 in the SMD 40 is the same as the data format of the multiple MFs 305 in the FMD 30. By reading the segment index 4031 of the playable segment 403, the SMD 40 has enough information to provide the media data 603 of the multiple MFs 403 under the situation of non-continuous reading. In contrast, the FMD 30 is restricted by reading the MF random access point 307 to acquire the data of the MF 305 in the next FMD 30.

For example, when the user equipment 107 downloads the real-time AVS from the server 105 and plays the SMD 40 on the browser software, the browser software analyzes the data format of the SMD 40, reads the initial segment information 401 to acquire the general data of the multimedia, and identifies each MF 4035 according to the segment index 4031 of each playable segment 403. Accordingly, when the browser software does not download the playable segments 403 or the MFs 4035 according to the order of the playable segments 403 and/or the order of MFs 4035 (e.g., the time axis order of the multimedia or each segment order), the browser software can still play the downloaded playable segments 403 and/or MFs 4035 on the multimedia interface. Therefore, the server 20 provided in FIG. 2 of the embodiment of the present disclosure not only transforms the real-time AVS into the FMD 30 in FIG. 3 to increase the transforming efficiency but also encapsulates the FMD 30 into the SMD 40 in FIG. 4 to increase the efficiency of downloading and playing the real-time AVS for the user equipment 107 and reduce the waiting time for users. Hence, the browser software can play the real-time AVS more similar to the playing time in the live scene. The discrepancy between the user equipment 107 and the live scene can be reduced and the user experiences when watching the real-time AVS can be improved.

Figure 7:
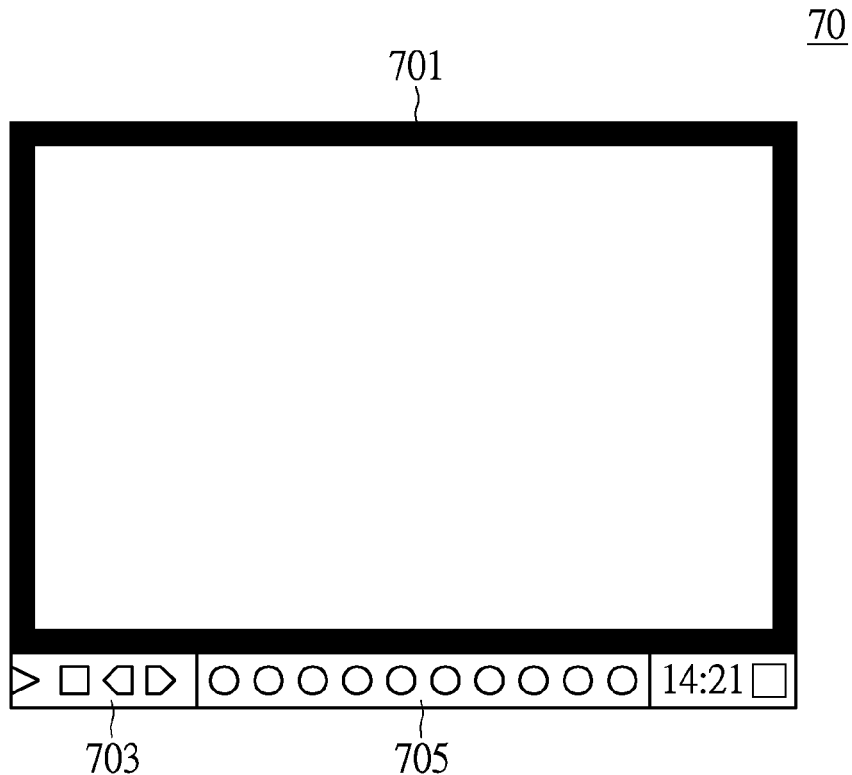
FIG. 7 is the multimedia interface of the browser software provided in accordance with an embodiment of the present disclosure.

FIG. 7 is the multimedia interface of the browser software provided in accordance with an embodiment of the present disclosure. Referring to FIG. 7, the multimedia interface 70 comprises a display screen 701, multiple control buttons 703 and multiple time point buttons 705. The display screen 701 is the screen area for displaying the real-time AVS. The control buttons 703 in FIG. 7 are the control buttons provided for the user to decide whether to receive the real-time AVS, for example, the control buttons of play, stop, forward or back. In one embodiment, after the user presses the playback control button, the server 105 in FIG. 1 provides the encapsulated SMD to the user equipment 107 according to the playback command. In another embodiment, after receiving the playback command, the server 105 in FIG. 1 begins to proceed the encapsulating procedure of the SMD. The server 105 only proceeds the encapsulating procedure when the playback is requested by the user so as to save the processing resource of the server 105. In a further embodiment, the browser software can provide a multimedia interface without the control buttons. When the user opens a webpage with a Universal Resource Locator (URL) which can direct to the real-time AVS and the server 105 receives the request of the Internet transmission protocol such as HTTP or HTTPS successfully, the server 105 transfers the network packets of the SMD to the user equipment 107.

The multiple time point buttons 705 in FIG. 7 is provided for the user to directly switch the playing time point of the real-time AVS. Referring to FIG. 4 and FIG. 7, in the present embodiment, each playable segment 403 in the FIG. 4 may further comprises multiple continuous MFs 4035 encapsulated in one segment data (Segment) 4033 as illustrated by the dotted line in FIG. 4. Hence, a playable segment 403 may comprises at least one segment data 4033. For example, if each MF 4035 has the playing time of 1 second, the segment data 4033 with 10 MFs 4035 can provide the real-time AVS for 10 seconds. Thus, the user equipment 107 in FIG. 1 can store the downloaded segment data 4035 in the buffer for playback. The user may design each MF 4035 and/or the segment data 4033 in different playing time lengths according to practical demands. The present embodiment is merely provided for illustration, without any intention to limit the scope of the present disclosure. The multiple time point buttons 705 on the multimedia interface of the browser software may correspond to the segment data 4033 respectively. For example, every 10 seconds is a time unit for playing forward or playing back. The user can directly utilize the time point to request the specific real-time AVS to the server. Hence, the downloading time for the unnecessary real-time AVS can be saved and the user may still watch the real-time multimedia information smoothly.

The embodiment of the method for transferring real-time AVS

Figure 8:
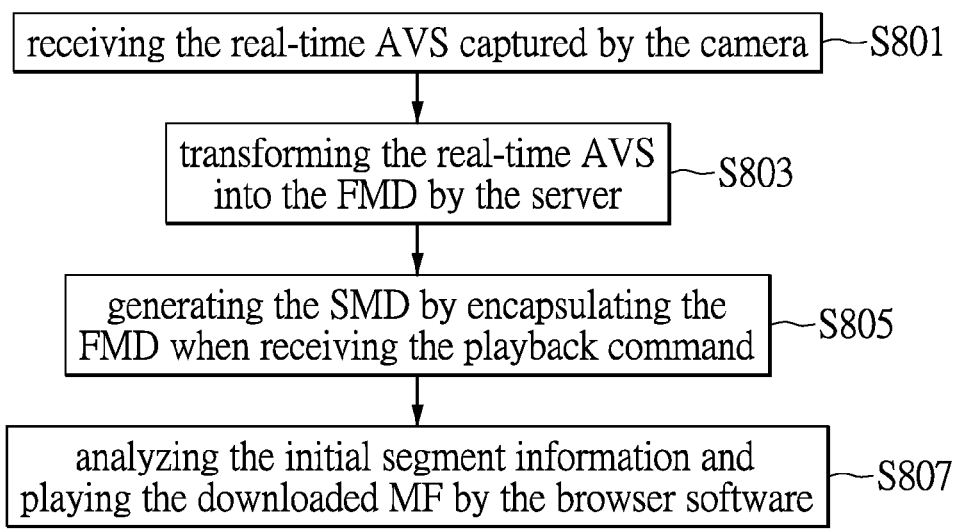
FIG. 8 is a flow chart of the method for transferring the real-time AVS provided in accordance with an embodiment of the present disclosure.

FIG. 8 is a flow chart of the method for transferring the real-time AVS provided in accordance with an embodiment of the present disclosure. First, in the step S801, the server receives the real-time AVS captured by the camera. Next, in the step S803, the server transforms the real-time AVS into the FMD. In the step S805, the server analyzes the FMD stored in the storage module and encapsulates the FMD into the SMD when receiving the playback command from the user equipment. Final, in the step S807, the user equipment receives the SMD, and the browser software analyzes the initial segment information, the playable segment and/or the MF and plays the real-time AVS on the multimedia interface.

It should be mentioned that the browser software in the embodiments of the present disclosure supports the hypertext markup language, specifically, the HTML5 so that the browser software can analyze the video tag in the webpage program. Thus, the user equipment can communicate with the server through the Internet communication protocol. With the FMD encoding technology and the SMD encapsulating technology provided in the embodiments of the present disclosure, the user equipment can directly play the real-time AVS provided by the server in the browser software through the video tag embedded in the webpage language.

Accordingly, the method and system for transferring real-time AVS provided in the embodiments of the present disclosure make the server transform the real-time AVS into the FMD to save the processing time for the real-time AVS and reduce the loading time. Further, after receiving the playback commend from the user equipment, the server can encapsulate the FMD into the SMD to increase the efficiency of downloading and playing the real-time AVS for the user equipment. Besides, the FMD and SMD provided in the embodiments of the present disclosure are the modifications from the same multimedia data format. Thus, the browser software of the user equipment does not need to install any additional codec. The browser software only needs to plug Application Programming Interface (API) to analyze the data format of the SMD. Then the browser software can successfully decode the multimedia information in the data format by utilizing self-codec and play the real-time AVS on the multimedia interface of the browser software for the user.

The above-mentioned descriptions represent merely the embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for transferring real-time audio/video stream (AVS), comprising:
  receiving a real-time AVS by a server;
  transforming the real-time AVS into a fragmented media data (FMD) and storing the FMD in a storage module of the server, wherein the FMD comprises a starting-point, an overall fragment information and at least one media fragment (MF);

generating a segmented media data (SMD) by encapsulating the FMD when the server receives a playback command, wherein the SMD comprises an initial segment information and at least one playable segment, each playable segment has multiple MFs and a segment index recording segment order to indicate each MF, the step of generating the SMD comprises encapsulating the starting-point and the overall fragment information into the initial segment information;

transferring the SMD to a browser software for playback; when the SMD is played by the browser software, the initial segment information is analyzed by the browser software for identifying the starting-point of the SMD, and starting downloading the each of the playable segment; in which the MFs with latter segment index are played when the MFs with the latter segment index have been downloaded and the MFs with former segment index are not completely downloaded; and wherein the playable segment comprises at least one segment data, the segment data is composed of a predetermined amount of the MFs, each of the segment data is stored in a buffer of the server for accessing by the browser software.

2. The method for transferring real-time AVS as claimed in claim 1, wherein the step of analyzing the initial segment information further comprises retrieving a segment data information to acquire a metadata of the SMD.

3. The method for transferring real-time AVS as claimed in claim 2, further comprising:

analyzing, by the browser software, an overall segment description of the segment data information to identify a media characteristic information of each playable segment, and analyzing a track information of the segment data information to identify an overall track information of the real-time AVS.

4. The method for transferring real-time AVS as claimed in claim 1, wherein the step of playing the playable segment comprises reading the segment index to identify the fragment order of each MF in the playable segment, reading a fragment description information of each MF to acquire a fragment header and a track information of the MF, and playing a media data of the MF according to the fragment order, the fragment header and the track information of the MF.

5. The method for transferring real-time AVS as claimed in claim 4, wherein the browser software reads the next playable segment of the SMD after playing the playable segment and before end of the real-time AVS.

6. The method for transferring real-time AVS as claimed in claim 1, wherein the browser software renders a multimedia interface comprising multiple time point buttons, the time point buttons corresponds to the segment data for playing back and playing forward the real-time AVS in the browser software.

7. A system for transferring real-time AVS, comprising:
a server, configured to receive a real-time AVS generated by at least one camera from network, and the server performs:

transforming the real-time AVS into a fragmented media data (FMD), wherein the FMD comprises a starting-point, an overall fragment information and at least one media fragment (MF);

storing the FMD in a storage module of the server;

transforming the FMD into segmented media data (SMD); wherein the SMD is generated by encapsulating the FMD when the server receives a playback command, wherein the SMD comprises an initial segment information and at least one playable segment, each playable segment has multiple MFs and a segment index recording segment order to indicate each MF, the step of generating the SMD comprises encapsulating the starting-point and the overall fragment information into the initial segment information; and transferring the SMD requested from a browser software for playback by a network transfer protocol;

wherein, when the SMD is played by the browser software, the initial segment information is analyzed by the browser software for identifying the starting-point of the SMD, and starting downloading the each of the playable segment; in which the MFs with latter segment index are played when the MFs with the latter segment index have been downloaded and the MFs with former segment index are not completely downloaded;

wherein the at least one playable segment comprises at least one segment data, the segment data is composed of a predetermined amount of the MFs, each of the segment data is stored in a buffer of the server for accessing by the browser software.

8. The system for transferring real-time AVS as claimed in claim 7, wherein the network transfer protocol is the Hypertext Transfer Protocol (HTTP) or the Hypertext Transfer Protocol Secure (HTTPS).

9. The system as claimed in claim 7, wherein the browser software is used to identify a media characteristic information of each playable segment, and to analyze a track information of the segment data information to identify an overall track information of the real-time AVS.

10. The system as claimed in claim 7, wherein the playable segment comprises at least one segment data, the segment data is composed of a predetermined amount of the MFs, each of the segment data is stored in a buffer of the server for accessing by the browser software.

11. The system as claimed in claim 10, wherein the browser software renders a multimedia interface comprising multiple time point buttons, the time point buttons corresponds to the segment data for playing back and playing forward the real-time AVS in the browser software.

* * * * *